(12) United States Patent
Johnson et al.

(10) Patent No.: US 6,780,949 B2
(45) Date of Patent: Aug. 24, 2004

(54) OLEFIN POLYMERIZATION PROCESS

(75) Inventors: Lynda Kaye Johnson, Wilmington, DE (US); Stephan J. Mclain, Wilmington, DE (US); Karl J. Sweetman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 46 days.

(21) Appl. No.: 10/295,319

(22) Filed: Nov. 15, 2002

(65) Prior Publication Data

US 2003/0130450 A1 Jul. 10, 2003

Related U.S. Application Data

(60) Provisional application No. 60/407,924, filed on Sep. 3, 2002, provisional application No. 60/332,799, filed on Nov. 16, 2001, and provisional application No. 60/332,798, filed on Nov. 16, 2001.

(51) Int. Cl.$^7$ .................................................. C08F 4/26
(52) U.S. Cl. ...................... 526/172; 526/126; 502/158; 502/171; 502/167
(58) Field of Search ................................. 526/126, 172

(56) References Cited

U.S. PATENT DOCUMENTS

| 4,906,754 A | 3/1990 | Klabunde |
| 5,030,606 A | 7/1991 | Klabunde |
| 6,492,473 B1 * | 12/2002 | Canich et al. |
| 6,511,934 B1 * | 1/2003 | Cook et al. |

FOREIGN PATENT DOCUMENTS

| WO | WO 99/05189 A1 | 2/1999 |

* cited by examiner

Primary Examiner—Caixia Lu

(57) ABSTRACT

Olefin polymerizations employing a complex of a Group 8, 9, or 10 transition metal with a bidentate ligand as part of the polymerization catalyst system are improved by adding to the polymerization a silicon compound in which at least one atom of a Group 15 or 16 element is bound to a silicon atom. The polymerizations often have increased polymer productivity and/or the polymerization catalyst has a longer half life.

8 Claims, 1 Drawing Sheet

OLEFIN POLYMERIZATION PROCESS

FIELD OF THE INVENTION

The productivity and/or lifetime of certain late transition metal olefin polymerization catalysts are increased by carrying out the polymerization in the presence of selected silicon compounds.

TECHNICAL BACKGROUND

Many types of olefin polymerization catalysts are known, and others are constantly being sought, due to the commercial importance of polyolefins. In the last few years interest in late transition metal olefin polymerization catalysts has been quite high, partially because of the discovery that they often can produce polyolefins which have unique structures, and/or they can copolymerize polar co-monomers.

One problem with some of these catalysts however is their relatively low polymer productivity, and/or their relatively short half lives in the polymerization, and/or their sensitivity to decomposition at elevated temperatures. Some or all of these factors are often interrelated. It has been discovered that the presence of certain silicon compounds during the polymerization often helps alleviate one or more of these problems.

WO9905189 (incorporated by reference herein for all purposes as if fully set forth) describes the copolymerization of polar (functional) olefins with ethylene using certain Ni catalysts. Among the polar olefins are a variety of silanes.

SUMMARY OF THE INVENTION

This invention concerns a process for the polymerization of olefins, comprising the step of contacting, under coordination polymerization conditions:

a monomer component comprising a polymerizable olefins;

an active polymerization catalyst comprising a Group 8, 9 or 10 (IUPAC) transition metal complex of a bidentate ligand; and an organic silicon compound in which at least one atom of a Group 15 or 16 (IUPAC) element is bound directly to a silicon atom.

This invention also concerns an improved process for the polymerization of olefins, said process comprising the step of contacting, under coordination polymerization conditions:

a monomer component comprising a polymerizable olefins, and an active polymerization catalyst comprising a Group 8, 9 or 10 transition metal complex of a bidentate ligand, wherein the improvement comprises contacting said monomer component and active polymerization catalyst in the presence of an organic silicon compound in which at least one atom of a Group 15 or 16 element is bound directly to a silicon atom.

These and other features and advantages of the present invention will be more readily understood by those of ordinary skill in the art from a reading of the following detailed description. It is to be appreciated that certain features of the invention which are, for clarity, described below in the context of separate embodiments, may also be provided in combination in a single embodiment. Conversely, various features of the invention which are, for brevity, described in the context of a single embodiment, may also be provided separately or in any sub-combination.

DETAILED DESCRIPTION OF THE PREFERRED EMBODIMENTS

Figure 1:
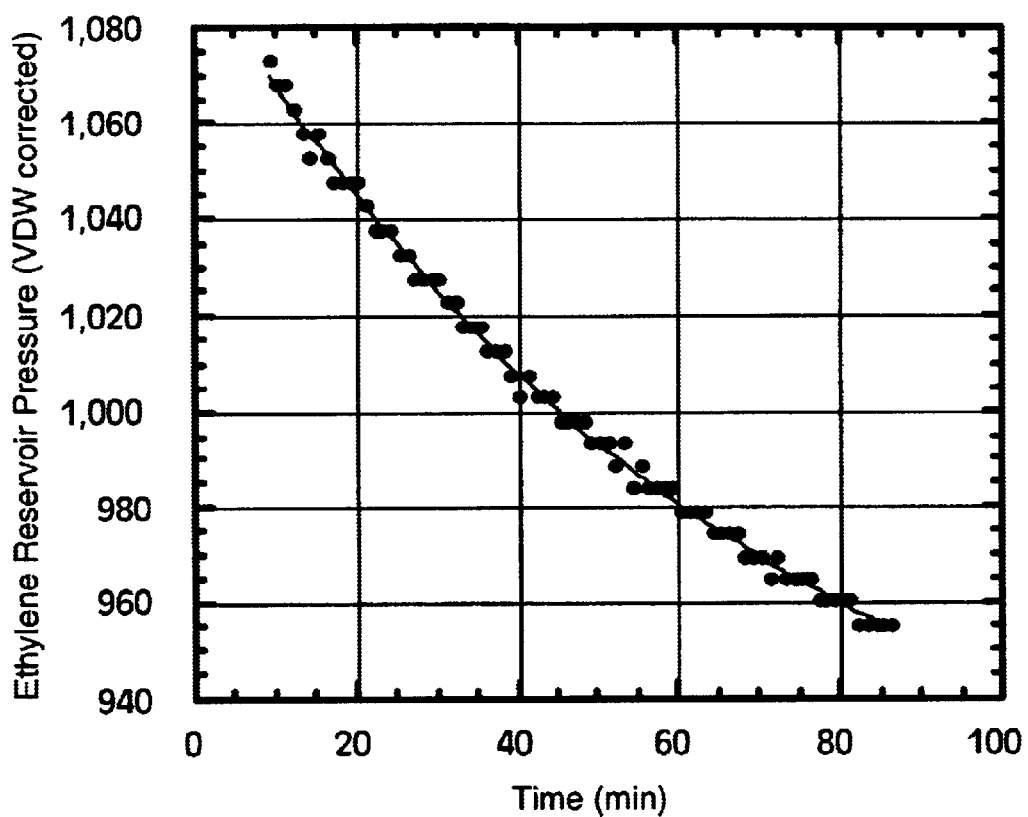
FIG. 1 shows the decrease in pressure (corrected for nonideality) in the ethylene reservoir as described in Example 1, and hence shows the rate of polymerization of ethylene in this example.

Herein certain terms are used. Some of them are:

A "hydrocarbyl group" is a univalent group containing only carbon and hydrogen. If not otherwise stated, it is preferred that hydrocarbyl groups herein preferably contain 1 to about 30 carbon atoms.

By "substituted hydrocarbyl" herein is meant a hydrocarbyl group that contains one or more substituent groups which are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that substituted hydrocarbyl groups herein contain 1 to about 30 carbon atoms. Included in the meaning of "substituted" are chains or rings containing one or more heteroatoms, such as nitrogen, oxygen and/or sulfur, and the free valence of the substituted hydrocarbyl may be to the heteroatom. In a substituted hydrocarbyl, all of the hydrogens may be substituted, as in trifluoromethyl.

By "(inert) functional group" herein is meant a group other than hydrocarbyl or substituted hydrocarbyl which is inert under the process conditions to which the compound containing the group is subjected. The functional groups also do not substantially interfere with any process described herein that the compound in which they are present may take part in. Examples of functional groups include halo (fluoro, chloro, bromo and iodo), ether such as —$OR^{25}$, —$CO_2R^{22}$, —$NO_2$, and —$NR^{22}{}_2$, wherein each $R^{22}$ is independently hydrocarbyl or substituted hydrocarbyl. In cases in which the functional group may be near a nickel atom the functional group should not coordinate to the metal atom more strongly than the groups in compounds which are shown as coordinating to the metal atom, that is they should not displace the desired coordinating group.

By a "cocatalyst" or a "catalyst activator" is meant a compound that reacts with a transition metal compound to form an activated catalyst species. One such catalyst activator is an "alkyl aluminum compound" which, herein, is meant a compound in which at least one alkyl group is bound to an aluminum atom. Other groups such as, for example, alkoxide, hydride and halogen may also be bound to aluminum atoms in the compound.

By "aryl" is meant a monovalent aromatic group in which the free valence is to the carbon atom of an aromatic ring. An aryl may have one or more aromatic rings which may be fused, connected by single bonds or other groups, such as 9-anthracenyl, 1-naphthyl, biphenyl or diphenyl ether. Unless otherwise stated aryl groups preferably contain 5 to 30 carbon atoms.

By "substituted aryl" is meant a monovalent aromatic group substituted as set forth in the above definition of "substituted hydrocarbyl". Suitable substituents include alkyl, aryl such as phenyl, halo, alkoxy, ester, dialkylamino and nitro. Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon. Unless otherwise stated, substituted aryl groups contain 5 to about 30 carbon atoms.

By "heteroaryl" is meant a substituted aryl in which the free valence is to a hetero atom of an aromatic ring, but which is otherwise unsubstituted (as in aryl). The term "(hetero)aryl" includes both aryl and heteroaryl.

By "substituted heteroaryl" is meant a heteroaryl otherwise substituted as set forth above for "substituted hydrocarbyl". The term "substituted (hetero)aryl" includes both substituted aryl and substituted heteroaryl.

By a "monoanionic ligand" is meant a ligand with one negative charge.

By a "neutral ligand" is meant a ligand that is not charged.

By an "organic silicon compound" is meant a silicon compound which is not polymeric (but which may be oligomeric, for example relatively low molecular weight linear or cyclic siloxanes) and which contains at least one carbon atom which does not have to be bound to a silicon atom. The organic silicon compound may contain more than one silicon atom. Compounds in which there are no carbon atoms bound directly to silicon, such as ethyl orthosilicate are considered organic silicon compounds herein.

By a "vinylsilane" is meant a compound in which at least one vinyl group (—CH=CH$_2$) is bonded directly to a silicon atom. Other groups may also be bonded to the silicon atom(s) present, and the compound may contain more than one silicon atom.

By a "bidentate ligand" here is meant a ligand that has at least two heteroatoms (or heteroatom containing groups) and which are in mutual positions where they may potentially coordinate to the transition metal. Such heteroatoms include O, S, N, P and Se, and the heteroatoms may be independently selected. Alternatively one or both of the coordination sites in a bidentate ligand may have a carbon atom present.

By a "hydrocarbyloxysilane" is meant a compound containing at least one hydrocarbyloxy or substituted hydrocarbyloxy group bound directly to a silicon atom. The carbon atom bound to the oxygen atom of the hydrocarbyloxy or substituted hydrocarbyloxy group which is directly bound to the silicon atom is a saturated carbon atom, that is that carbon atom has four single bonds to it.

By an "alkoxysilane" is meant a compound containing at least one alkoxy bound directly to a silicon atom.

By a "heteroatom connected monovalent radical" is meant a substituted hydrocarbyl which is a monovalent radical or group which is connected to the rest of the compound through a valence of a heteroatom (an atom other than C and H). The group may be more than monovalent if it is part of a ring connected by a bridging group.

By "under coordination polymerization conditions" is meant the conditions for a coordination polymerization that are usually used for the particular polymerization catalyst system being used (except as otherwise indicated herein). These conditions include things such as pressure, temperature, catalyst and cocatalyst (if present) concentrations, the type of process such as batch, semibatch, continuous, gas phase, solution or liquid slurry etc., except as modified by conditions specified or suggested herein. Conditions normally done or used with the particular polymerization catalyst system, such as the use of hydrogen for polymer molecular weight control, are also considered "under polymerization conditions". Other polymerization conditions such as presence of hydrogen for molecular weight control, other polymerization catalysts, etc., are applicable with this polymerization process and may be found in the references cited herein.

In the context of the present invention, the use of "a" refers to one or more unless otherwise specifically stated. For example, "a vinylsilane" refers to one or more vinyl silanes.

Also in the context of the present invention, the use of "comprising" is open-ended as in its normal meaning, unless otherwise specifically stated. For example, "a monomer mixture comprising ethylene" may also include one or more other copolymerizable monomers. As another example, "an active polymerization catalyst comprising a complex of a bidentate ligand" may include the complex itself if such complex is in and of itself an active polymerization catalyst, or may also include one or more cocatalysts as required to activate such complex.

Useful complexes with neutral ligands include those described in U.S. Ser. No. 2001025244, U.S. Pat. Nos. 5,714,556, 5,852,145, 5,880,241, 5,955,555, 6,030,197, 6,034,240, 6,090,900, 6,103,658, 6,232,259, 6,200,925, 6,242,377, JP-A-09025713, JP-A-11158213, JP-A-11158214, WO9847934, WO9849208, WO0006620, WO0018776, WO0020377, WO0021971, WO0050470, WO0050474, WO0059956, WO0059961, WO0068280, WO0110876, WO0125298, WO0142257, and U.S. Provisional Application Serial No. 60/294,794 (filed May 31, 2001), all of which are hereby incorporated by reference herein for all purposes as if fully set forth.

Monoanionic ligands and their transition metal complexes are found in U.S. Pat. Nos. 6,057,466, 6,060,569, 6,174,975, 6,174,976, 6,174,976, 6,184,428, 6,245,871, 6,242,623, WO0020377, WO0056785, WO0059956, WO0119786, EP-A-0950667, EP-A-1101768, JP-A-11199592, JP-A-11199593, JP-A-2000086677, JP-A-2000028170, U.S. patent application Ser. No. 09/871,099 (filed May 31, 2001), U.S. patent application Ser. No. 09/871,100 (filed May 31, 2001), and U.S. Provisional Application Serial No. 60/308, 974 (filed Jul. 31, 2001), all of which are hereby incorporated by reference herein for all purposes as if fully set forth.

Another useful general reference on late transition metal polymerization catalysts and processes is S. D. Ittel, L. K. Johnson and M. Brookhart, *Chem. Rev.*, 2000, 100, 1169, which is hereby included by reference. Besides describing the ligands and complexes and how to make them, most of these references also describe the types of olefins that may be polymerized, conditions for activating the transition metal complexes (where needed), useful cocatalyst(s), and other polymerization conditions (e.g., pressure, temperature). These and many other references describe variations on the use of these polymerization catalysts, such as the use of supports, chain transfer agents, mixed (two or more) catalysts, process types (for example gas phase, liquid slurry, etc.). The conditions described in these documents for carrying out the polymerizations, particularly polymerizations of ethylene, are also applicable to the first process described herein.

Preferred transition metals in these polymerizations are Fe, Co, Ni and Pd, with Ni and Pd being more preferred, and Ni being especially preferred.

The organic silicon compound (sometimes also referred to herein as the "silicon compound") must have at least one atom from elements of Group 15 or 16 bound to a silicon atom in the compound. Preferred Group 15 and 16 elements are N, O and S, and O is especially preferred. An atom of a Group 15 or 16 element may be bound to one or more different silicon atoms, for example oxygen may be present in the form of a siloxane (Si—O—Si) group. Useful silicon compounds include saturated and unsaturated silicon compounds such as hexamethyldisiloxane, trimethylaminosilane, ethylorthosilicate (tetraethoxysilane), methylorthosilicate, trimethylmethoxysilane, dimethyldiethoxysilane, methyltrimethoxysilane, vinyltrimethoxysilane, vinyltriehoxysilane, trimethylacetoxysilane, N-trimethylsilylacetamide, octamethylcyclotetrasiloxane, triethylsilanol, hexamethyldisilthiane, (phenyldimethylsilyl)methylsulfide, hexamethyldisilazane, and dimethylmethoxysilane. Preferred silicon compounds are those that contain at least one alkoxy group bound to a silicon atom, for example ethylorthosilicate (tetraethoxysilane), methylorthosilicate, trimethylmethoxysilane, dimethyldiethoxysilane, methyltrimethoxysilane, vinyltrimethoxysilane, vinyltriethoxysilane and dimethylmethoxysilane, and in these compounds methoxy and ethoxy groups are considered interchangeable. Preferred alkoxy groups are those containing 1 to 4 carbon atoms, more preferably methoxy and ethoxy. A preferred alkoxysilane has the formula $R^6_mSi(OR^7)_{4-m}$ wherein m is 0 or an integer of 1 to 3, each $R^6$ is independently alkyl containing 1 to 4 carbon atoms, and each $R^7$ is independently alkyl containing 1 to 4 carbon atoms.

As indicated above, the silicon compound may contain an olefinic double bond so that it may copolymerize into the polyolefin being prepared. A preferred type of olefinic bond is a vinylsilane, in which at least one vinyl group is bound directly to a silicon atom. In another preferred form the silicon compound does not contain a copolymerizable olefinic double bond. In another preferred form more than one Group 15 and/or 16 atoms are bound to one silicon atom.

The molar ratio of silicon compound to transition metal complex is preferably about 1:1 to about 100,000:1, more preferably about 10:1 to about 20,000:1, and especially preferably about 100:1 to about 5,000:1. If a liquid medium in present (for example in a slurry or solution type process) the silicon compound is preferably soluble in the liquid medium. If the polymerization is a gas phase process the silicon compound is preferably volatile enough at the process temperature so that a sufficient-concentration can be maintained in the polymerization reactor.

The silicon compound may be added to a polymerization reactor containing a liquid medium as a solution in the liquid medium or as a separate side stream. For a gas phase polymerization the silicon compound may be separately volatilized and added as a separate gas stream, added as a liquid which volatilizes, or may be diluted into a gaseous olefin (for example stream) before entering the polymerization reactor. In a batch or semibatch polymerization the silicon compound may be present before the polymerization begins or may be added just as or just after the polymerization starts.

A preferred olefin for the polymerization is ethylene. The ethylene may be the only polymerizable olefin present or other copolymerizable olefins may be present so that an ethylene copolymer is formed. Other copolymerizable olefins include polar comonomers such as acrylate esters and vinylsilanes, and the latter can act not only as the silicon compound but also as a copolymerizable monomer. What monomers may be used with what polymerization catalyst systems will be found in the above listed references on some of the various ligands which may be used.

Preferred neutral ligands are α-diimines, such as those described in previously incorporated U.S. Pat. Nos. 5,880, 241, 6,103,658, WO0050470 and WO0142257. By an "α-diimine" in a general sense is meant a compound having the structure

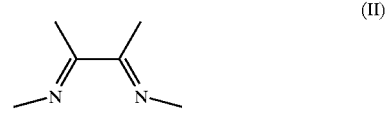

(II)

wherein the free bond to the carbon atoms are any organic grouping (including an organic grouping which is attached to the carbon atom through a heteroatom and/or is cyclic in nature involving both such carbon atoms) or hydrogen, and the free bonds to nitrogen are any organic grouping (including an organic grouping which is attached to the carbon atom through a heteroatom). In one particularly preferred form (II) has the formula

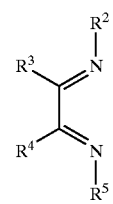

(V)

wherein:

$R^2$ and $R^5$ are each independently hydrocarbyl or substituted hydrocarbyl, provided that the atom in $R^2$ and $R^5$ bound to the imino nitrogen atom has at least two carbon atoms bound to it; and $R^3$ and $R^4$ are each independently hydrogen, hydrocarbyl or substituted hydrocarbyl, or $R^3$ and $R^4$ taken together are hydrocarbylene or substituted hydrocarbylene to form a carbocyclic ring.

When a heteroatom is present in one or more of groups $R^2$, $R^3$, $R^4$ or $R^5$, that heteroatom is preferably from Group 15 or Group 16 of the Periodic Chart (IUPAC) and, more preferably, N, O or S.

Preferably $R^2$ and $R^5$ are o-disubstituted (hetero)aryl groups (that is the positions next to the atom of the (hetero) aryl atom bound to the imino nitrogen atom are both substituted). A preferred type of group for $R^2$ and $R^5$ is a 2,6-disubstituted phenyl group, with the other positions on the phenyl ring optionally substituted. Such useful groups include 2,6-dimethylphenyl, 2,4,6-trimethylphenyl, 2,6-dichlorophenyl, 2,6-diisopropylphenyl, 2,6-dimethoxyphenyl, 2-chloro-6-methoxyphenyl, and 2,6-diphenylphenyl groups in which with 2- and 6-phenyl groups are optionally substituted. Particularly preferred types of 2,6-disubstituted phenyl groups are 2,6-diaryl or 2,6-bis(substitutedaryl) groups, such as 2,6-diphenylphenyl or 2,6-bis(4-t-butylphenyl)phenyl. Also useful are heteroatom connected monovalent radicals such a pyrryl or substituted pyrryl groups, especially 2,5-disubstituted pyrryl groups.

A preferred grouping for $R^3$ and $R^4$ being taken together to form a ring is

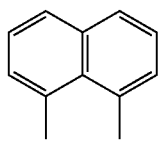

(VI)

herein abbreviated "An".

In general, specific preferred ligands (V) are those preferred in previously incorporated U.S. Pat. Nos. 5,880,241, 6,103,658, WO0050470 and WO0142257.

After the polyolefin is formed in the polymerization process, depending how the polymer is isolated, some quantity of the silicon compound may be present (as separate compounds) in the polyolefin. If the silicon atoms in the silicon compound have two hydrolyzable groups bound to them, these, with time and depending on the exposure to moisture, will likely hydrolyze and form polymers or oligomers. If three hydrolyzable groups are present the silicon compound will probably eventually form a crosslinked resin, while if 4 hydrolyzable groups are bound to the silicon atom, silica or silica gel may be formed. Since the silicon compound is present in only in small quantities in the polymerization process, the presence of these silicon containing resides is not likely to adversely affect the properties of the polyolefin product.

The addition of the organic silicon compounds described herein often increases the lifetime of the olefin polymerization process and/or increases the polymer productivity of the polymerization catalyst (transition metal complex), particularly when very low concentrations of the transition metal complex are used in the polymerization. The increase in the lifetime of the polymerization process is believed due, at least in part, because the half life of the polymerization catalyst system activity is greatly increased, see for instance Example 1.

The polymers formed in this improved process are useful for many things for example films for packaging, molding resins, and many other uses, see for example previously incorporated U.S. Pat. No. 5,880,241.

In the Examples, the following abbreviations are used:

ATMoS—allyltrimethoxysilane i-Bu—isobutyl

Et—ethyl

GPC—gel permeation chromatography

Me—methyl

MMAO-IP—modified methylaluminoxane containing some isobutyl groups in place of methyl groups RB—round-bottomed Mn—number average molecular weight Mp—peak molecular weight MW—molecular weight Mw—weight average molecular weight PDI—Mw/Mn RT or rt—room temperature TMoS—trimethoxysilane (a univalent group)

TMS—tetramethylsilane

VTMoS—vinyltrimethoxysilane

In the Examples, the following transition metal complexes were used. Synthetic methods for these types of complexes are found in previously incorporated U.S. Pat. No. 5,880,241.

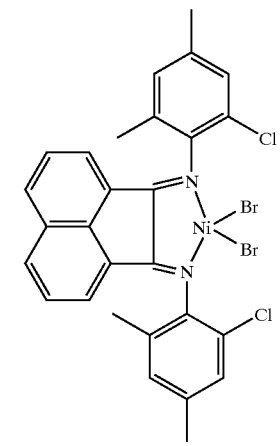

A

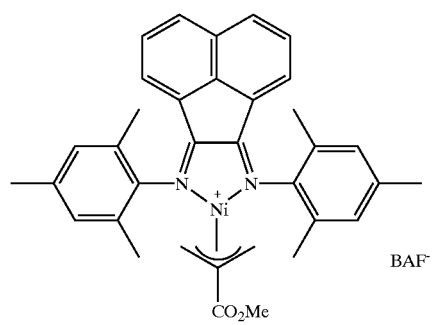

B

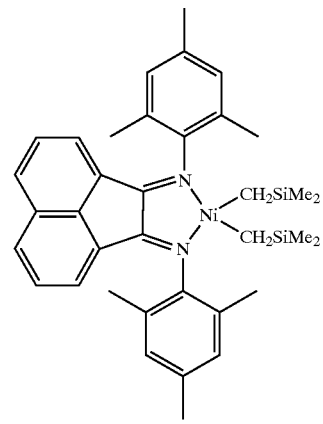

C

Example 1

The following solutions were prepared in a dry box:

A (6.1 mg) was dissolved in 3 mL of chlorobenzene;

MMAO-IP (0.127 g) (Akzo Nobel, solvent removed in vacuo) was dissolved in 3 mL of chlorobenzene; and anhydrous isooctane (141 mL) was placed in an oven-dried 250 mL RB flask. The flask was sealed with rubber septa.

The above stock solution of A (0.492 mL) was placed in a dried scintillation vial and diluted with 3 mL of VTMoS and sealed with a septum. The MMAO-IP solution was septa sealed in a scintillation vial. All 3 solutions were removed from the dry box. The isooctane was charged to a 400 ml, $N_2$ purged autoclave followed by the MMAO-IP solution. The catalyst/VTMoS solution was charged to a catalyst addition tube above the reactor.

The reactor was purged 3× with >690 kPa ethylene with stirring at 1300 RPM and then heated to 60.5° C. The ethylene pressure at the reactor was set at 4.00–4.07 MPa. The catalyst tube was pressurized to 6.89 MPa. The reaction was initiated by pressure injection of the catalyst solution at 6.89 MPa into the autoclave. The reaction was allowed to proceed at 60.5° C., 6.89 MPa ethylene for 74 min. The reaction rate was monitored by measuring the pressure drop in the reservoir that fed the constant pressure autoclave. The measured ethylene values were corrected to ideal gas values using the Van der Wals equation.

A graph of this ethylene consumption with time is shown in FIG. 1. The graph of ethylene pressure vs. time was fit to an equation that assumes that the catalyst deactivation is first order in Ni. This fit yields a half life of 48 min for this polymerization. This is more than five times the half life of a comparable ethylene polymerization in the absence of VTMoS.

The reactor was then vented over about 30 sec and cooled to RT. The reaction mixture was filtered and the insoluble polymer was washed 3× with 100 mL portions of methanol. A small sample was removed for NMR analysis. Branching and VTMoS content were determined by $^1$H NMR in $d_2$-1,1,2,2-tetrachloroethane at 120° C. The $(CH_3O)_3Si$- peaks are at approximately 3.58–3.68 ppm downfield of TMS. VTMoS content: 1.2 wt %. $^1$H NMR branching ($CH_3$ per 1000 $CH_2$): 9.3.

The bulk of the polymer (after filtration) was charged to a 250 ml Erlenmeyer flask along with 2.15 g of 8-hydroxyquninoline, 1.495 g of triethylamine and 50 mL of reagent grade methanol. This mixture was stirred overnight at RT under $N_2$ (it is believed soluble Ni and Al species that can be removed from the polymer by filtration are formed). After stirring overnight the polymer was filtered and dried in vacuo for 3 days. Polymer yield 11.57 g (153 kg polymer/g Ni).

Analytical Methods for the Following Examples

GPC molecular weights are reported versus polystyrene standards. Unless noted otherwise, GPC's were run with RI detection at a flow rate of 1 mL/min at 135° C. with a run time of 30 min. Two columns were used: AT-806MS and WA/P/N 34200. A Waters RI detector was used and the solvent was TCB with 5 grams of BHT per gallon. Dual UV/RI detection GPC was run in THF at rt using a Waters 2690 separation module with a Waters 2410 RI detector and a Waters 2487 dual absorbance detector. Two Shodex columns, KF-806M, were used along with one guard column, KF-G. In addition to GPC, molecular weight information was at times determined by $^1$H NMR spectroscopy (olefin end group analysis) and by melt index measurements (g/10 min at 190° C.).

Examples 2–5 and Comparative Example A

General Procedure for (Co)Polymerizations

In a nitrogen-purged drybox, a glass vial was loaded with the specified amount of $B(C_6F_5)_3$. Next, the solvent was added to the glass vial followed by the addition of any co-solvents and then comonomers. Finally, B dissolved in 0.4 mL of $Et_2O$ was added to the glass vial via syringe. The same standard solution of B was used for all of the entries in Table 1 below. The vial was greased and capped. The glass vial was then loaded in a reactor inside the drybox. The glass vials for all of the entries in each table below were loaded inside the same reactor. The reactor was then sealed, brought outside of the drybox, placed under the desired ethylene pressure and shaken mechanically. After the stated reaction time, the ethylene pressure was released and the glass vial was removed from the reactor. The polymer was precipitated by the addition of MeOH (~20 mL). A small amount of triethylamine was added to the solution, and optionally, approximately 1 mL of $(EtO)_3Si(i-Bu)$ or $(EtO)_4Si$. The polymer was then collected on a frit and rinsed with MeOH. The polymer was transferred to a pre-weighed vial and dried under vacuum overnight. The polymer yield and characterization were then obtained. Conditions and results are shown in Table 1.

$^{13}$C NMR spectra for any Si-containing copolymer were run without $Cr(acac)_3$ unless specified otherwise. $^{13}$C NMR spectra for any homopolymer of ethylene were run in the presence of $Cr(acac)_3$. For analysis of silyl group containing polymers see U.S. Provisional Patent Application 60/407,924, filed Sep. 3, 2002 which is hereby included by reference.

TABLE 1

(Co)polymerization of Ethylene (4.1 MPa) at 60° C. with B (0.0002 mmol) with a Variety of Comonomers/Additives (10 mL p-Xylene, 102.4 mg $B(C_6F_5)_3$, 18 h)

| Ex. | Comonomer or Additive 3.4 mmol | Yield g | Common. Incorp. Mol % | M.W. | Total Me |
|---|---|---|---|---|---|
| A | Non | 0.01 | — | $M_n(^1H)$ = No olefins | 102.3 ($^1$H) |
| 2 | n-OctylTMoS | 4.59 | — | $M_p$ = 51,137; $M_w$ = 63,261; $M_n$ = 22,970; PDI = 2.75 | 29.1 ($^1$H) |
| 3 | ATMoS | 0.64 | 0.68 ($^1$H) | $M_p$ = 33,413; $M_w$ = 39,015; $M_n$ = 17,278; PDI = 2.26 | 8.5 ($^1$H) |
| 4 | 1-Oct-7-enyl-TMoS | 1.40 | 0.22 ($^1$H) | $M_p$ = 56,021; $M_w$ = 60,351; $M_n$ = 30,271; PDI = 1.99 | 8.7 ($^1$H) |
| 5 | VTMoS | 3.15 | 1.07 ($^1$H) | $M_p$ = 45,250; $M_w$ = 54,557; $M_n$ = 22,577; PDI = 2.42 | 9.5 ($^1$H) |

Examples 6–9 and Comparative Examples B–E

General Procedure for Ethylene Polymerizations of Table 2

In a nitrogen-purged drybox, a glass vial with a gas inlet was loaded with the specified amounts of $B(C_6F_5)_3$, LiB$(C_6F_5)_4$ 2.5$Et_2O$, solvent, additive [9.6 μl i-BuSi(OMe)$_3$ or 11.2 μl $(EtO)_4Si$] and C. The $B(C_6F_5)_3$ was the first ingredient added to all experiments and was added as a standard solution in THF. The THF was allowed to evaporate prior to the addition of the other reactants. The LiB$(C_6F_5)_4$ 2.5 $Et_2O$ was added as a standard solution in $Et_2O$ and the $Et_2O$ was allowed to evaporate prior to the addition of the other reactants. The solvent and additive were added next followed by the addition of C as a standard solution in a 2.5 vol % solution of cyclopentene in $Et_2O$. The vial was greased and capped. The glass vial was then loaded in a reactor inside the drybox. The reactor was then sealed (with all of the Examples of Table 2), brought outside of the drybox, and placed under the desired ethylene pressure and shaken mechanically. After the stated reaction time, the ethylene pressure was released and the glass vial was removed from the reactor. The polymer was precipitated by the addition of MeOH (~20 mL). The polymer was then collected on a frit and rinsed with MeOH. The polymer was transferred to a pre-weighed vial and dried under vacuum for several days. The polymer yield and characterization were then obtained. Reconditions are shown in Table 2.

TABLE 2

Polymerization of Ethylene (1.0 MPa) at 60° C. with C, 1.3 mg $B(C_6F_5)_3$ and 1 equiv $LiB(C_6F_5)_4$ for 16 h in 10 mL Solvent

| Ex. | Additive | Solvent | Yield g | M.W. | Total Me |
|---|---|---|---|---|---|
| | | 0.0001 mmol C | | | |
| 6 | $(EtO)_4Si$ | Toluene | 0.76 | $M_w$ = 51,069; $M_n$ = 16,515 | 32.6 |
| B | None | Toluene | 1.03 | $M_w$ = 53,780; $M_n$ = 12,207 | 31.3 |
| 7 | i-BuSi(OMe)$_3$ | Cyclohexane | 0.98 | $M_w$ = 53,648; $M_n$ = 14,096 | 40.2 |
| C | None | Cyclohexane | 0.92 | $M_w$ = 50,187; $M_n$ = 13,450 | 44.8 |
| | | 0.00005 mmol C | | | |
| 8 | $(EtO)_4Si$ | Toluene | 0.16 | $M_w$ = 35,662; $M_n$ = 12,602 | 29.9 |
| D | None | Toluene | 0 | — | — |
| 9 | i-BuSi(OMe)$_3$ | Cyclohexane | 0.06 | $M_w$ = 79,980; $M_n$ = 11,861 | 43.9 |
| E | None | Cyclohexane | 0.01 | — | — |

What is claimed is:

1. A process for the polymerization of olefins, comprising the step of contacting, under coordination polymerization conditions:
    a monomer component comprising one or more polymerizable olefins;
    an active polymerization catalyst comprising a Group 8, 9 or 10 metal complex of a bidentate ligand; and
    an organic silicon compound of the formula $R^6{}_m Si(OR^7)_{4-m}$ wherein m is 0 or an integer of 1 to 3, each $R^6$ is independently alkyl containing 1 to 4 carbon atoms, and each $R^7$ is independently alkyl containing 1 to 4 carbon atoms.

2. An improved process for the polymerization of olefins, said process comprising the step of contacting, under coordination polymerization conditions:
    a monomer component comprising one or more polymerizable olefins, and an active polymerization catalyst comprising a Group 8, 9 or 10 metal complex of a bidentate ligand,
    wherein the improvement comprises contacting said monomer component and active polymerization catalyst in the presence of an organic silicon compound in which at least one atom of a Group 15 or 16 element is bound directly to a silicon atom of the formula $R^6{}_m Si(OR^7)_{4-m}$ wherein m is 0 or an integer of 1 to 3, each $R^6$ is independently alkyl containing 1 to 4 carbon atoms, and each $R^7$ is independently alkyl containing 1 to 4 carbon atoms.

3. The process as recited claim 1 or 2 wherein said bidentate ligand is an α-diimine.

4. The process as recited in claim 3 wherein said Group 8, 9 or 10 metal is Ni or Pd.

5. The process as recited in claim 1 or 2 wherein said Group 8, 9 or 10 metal is Ni or Pd.

6. The process as recited in claim 1 or 2 wherein the molar ratio of said organic silicon:said metal complex is about 1:1 to about 100,000:1.

7. The process as recited in claim 1 or 2 wherein said organic silicon compound is an alkoxysilane, the alkoxy group in said alkoxysilane contains 1 to 4 carbon atoms, said bidentate ligand is an α-diimine, said Group 8, 9 or 10 metal is Ni or Pd, and the molar ratio of said organic silicon:said metal complex is about 1:1 to about 100,000:1.

8. The process as recited in claim 1 or 2 wherein said one or more polymerizable olefins comprise ethylene.

* * * * *